(12) United States Patent
Chi et al.

(10) Patent No.: US 7,463,096 B2
(45) Date of Patent: Dec. 9, 2008

(54) DYNAMIC VOLTAGE AND FREQUENCY MANAGEMENT IN INTEGRATED CIRCUITS

(75) Inventors: Shyh-An Chi, Hsinchu (TW); Chih-Hung Chung, Saratoga, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 159 days.

(21) Appl. No.: 11/636,171

(22) Filed: Dec. 7, 2006

(65) Prior Publication Data

US 2008/0136400 A1 Jun. 12, 2008

(51) Int. Cl.
*H03L 7/00* (2006.01)
(52) U.S. Cl. .............. 331/2; 331/57; 331/46; 331/49; 323/318; 327/141; 327/538; 324/763
(58) Field of Classification Search ........ 331/2, 331/46, 49, 57; 323/318; 327/141, 538; 324/763
See application file for complete search history.

(56) References Cited

U.S. PATENT DOCUMENTS

2006/0119420 A1* 6/2006 Li et al. .............. 327/538

OTHER PUBLICATIONS

Masakatsu Nakai et al., "Dynamic Voltage and Frequency Management for a Low-Power Embedded Microprocessor", IEEE Journal of Solid-State Circuits, vol. 40, No. 1, Jan. 2005, pp. 28-35.

* cited by examiner

*Primary Examiner*—Arnold Kinkead
(74) *Attorney, Agent, or Firm*—K & L Gates LLP

(57) ABSTRACT

This invention discloses a system and method for dynamically managing voltage and frequency in an integrated circuit (IC), comprising a plurality of ring oscillators for generating a plurality of continuous pulses with frequencies reflecting the process parameter, operating voltage and temperature effects in the IC, a period generator for generating at least one gating period with a predetermined duration, a plurality of counters coupling to the plurality of ring oscillators as well as the period generator for counting the number of the continuous pulses in the gating period, at least one selector for selecting a predetermined number counted by the plurality of counters, and at least one voltage-and-frequency adjustment circuitry for adjusting one or more operating voltages or one or more clock frequencies in the IC based on the predetermined number selected by the selector, wherein the IC operating voltage or clock frequency correlates with the ring oscillator frequencies.

20 Claims, 5 Drawing Sheets

405

| Ring OSC count 410 | Corresponding voltage value 420 |
|---|---|
| Number n → | Minimum voltage value n |
| ⁞ | ⁞ |
| Number 1 → | Minimum voltage value 1 |

| Ring OSC Count 430 | Corresponding frequency 440 |
|---|---|
| Number n → | Minimum frequency n |
| ⁞ | ⁞ |
| Number 1 → | Minimum frequency 1 |

FIG. 4B

DYNAMIC VOLTAGE AND FREQUENCY MANAGEMENT IN INTEGRATED CIRCUITS

BACKGROUND

The present invention relates generally to integrated circuit designs, and more particularly, to a system and method for dynamically managing power and frequency in an integrated circuit.

Battery-powered electronics systems continue to demand greater performance while strictly limiting the power consumption by device electronics, and particularly by their processors which consume the most power in the systems. Such battery-powered systems include laptop computers, personal digital assistants (PDAs), cell phones, and personal music and/or video players.

The performance of a processor is determined by the frequency of operation and the number of operations that can be completed on average per processor clock cycle. A dynamic power consumed in a CMOS transistor resulting from the switching of a load capacitance, $C_L$, through a voltage, $V_{dd}$, at a clock frequency, f, is $$P = \frac{1}{2} C_L \cdot V_{dd}^2 \cdot f.$$

Then dynamic power consumed in a chip is the sum of the power consumed by all its switching nodes. It can be modeled as the power of switching the average switching capacitance of the system, $C_{SW}$, through the voltage, $V_{dd}$, $$P = \frac{1}{2} C_{SW} \cdot V_{dd}^2 \cdot f \quad (1)$$

Examination of Equation (1) shows that if a slight voltage dependence of the switching capacitance is ignored, the dynamic power consumption of a system is quadratically more sensitive to power-supply voltage than is the clock frequency. While clock frequency determines a system's performance, voltage is much more sensitive to power efficiency. When voltage supply to an integrated circuit is lowered, its operating frequency will be lowered as well. So in order to maintain a performance level, a certain clock frequency is required, then the system seeks a minimum voltage to maintain that clock frequency.

In some cases, different applications may have difference performance requirements. Using laptop computers as an example, the computational requirements can be considered to fall into one of three categories: compute-intensive, low-speed, and idle. Compute-intensive and short-latency tasks (e.g., video decompression, speech recognition, complex spreadsheet operations, etc.) utilize the full throughput of the processor. Low speed and long-latency tasks (e.g., text entry, address book browsing, playing music, etc.) only require a fraction of the full processor throughput to adequately run. Executing these tasks faster than the desired throughput rate has no discernible benefit. In addition, there are system idle periods because single-user systems are often not actively computing. A key design objective for the processor systems in these applications is to provide the highest possible peak throughput for the compute-intensive tasks while maximizing the battery life for the remaining low speed and idle periods.

A common power-saving technique is to reduce the clock frequency during non-compute-intensive activity. This reduces power, but does not affect the total energy consumed per task, since energy consumption is independent of clock frequency to a first order approximation. Intuitively, executing a task slower only takes longer time, and total energy consumption is still the same. Conversely, reducing the voltage of the processor improves its energy efficiency, but compromises its peak throughput. If, however, both clock frequency and supply voltage are dynamically varied in response to computational load demands, then the energy consumed per task can be reduced for the low computational periods, while retaining peak throughput when required. When a majority of the computation does not require maximum throughput, then the average energy consumption can be significantly reduced, thereby increasing the computation that can be done with the limited energy supply of a battery.

A prior art dynamic voltage and frequency management (DVFM) system employs dynamic frequency and voltage scaling separately. The dynamic frequency scaling module monitors activity levels of main logic circuits, and scales up the frequency when the circuit activity is high, and scales down the frequency when the circuit activity is low. After the frequency is determined, the separate dynamic voltage scaling module scales the supply voltage, i.e., increasing, decreasing or keeping the present supply voltage, based on delay information of the main logic circuits. There are drawbacks of this kind of DVFM system, such as its circuit is very complicated due to separate dynamic frequency and voltage scaling modules. It also cannot determine the lowest frequency the circuit can operate given a certain supply voltage.

As such, what is desired is a DVFM system that are easy to implement and can control voltage and frequency with greater flexibility.

SUMMARY

This invention discloses a system and method for dynamically managing voltage and frequency in an integrated circuit (IC), comprising a plurality of ring oscillators for generating a plurality of continuous pulses with frequencies reflecting process parameters, operating voltage and temperature (PVT) effects in the IC, at least one period generator for generating at least one gating period with a predetermined duration, a plurality of counters coupling to the plurality of ring oscillators as well as the period generator for counting the number of the continuous pulses in the gating period, at least one selector for selecting a value from a plurality of numbers counted by the plurality of counters, and at least one voltage-and-frequency adjustment circuitry for adjusting operating voltage or clock frequency in the IC based on the counted value selected by the selector.

The construction and method of operation of the invention, however, together with additional objectives and advantages thereof will be best understood from the following description of specific embodiments when read in connection with the accompanying drawings.

BRIEF DESCRIPTION OF THE DRAWINGS

FIGS. 4A and 4B illustrates an open-loop index table for voltage and frequency controls, respectively.

DESCRIPTION

The present invention discloses a system and method for dynamically managing voltage and frequency in integrated circuits (ICs).

The invention and the various features and advantageous details thereof are explained more fully with reference to the non-limiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Figure 1:
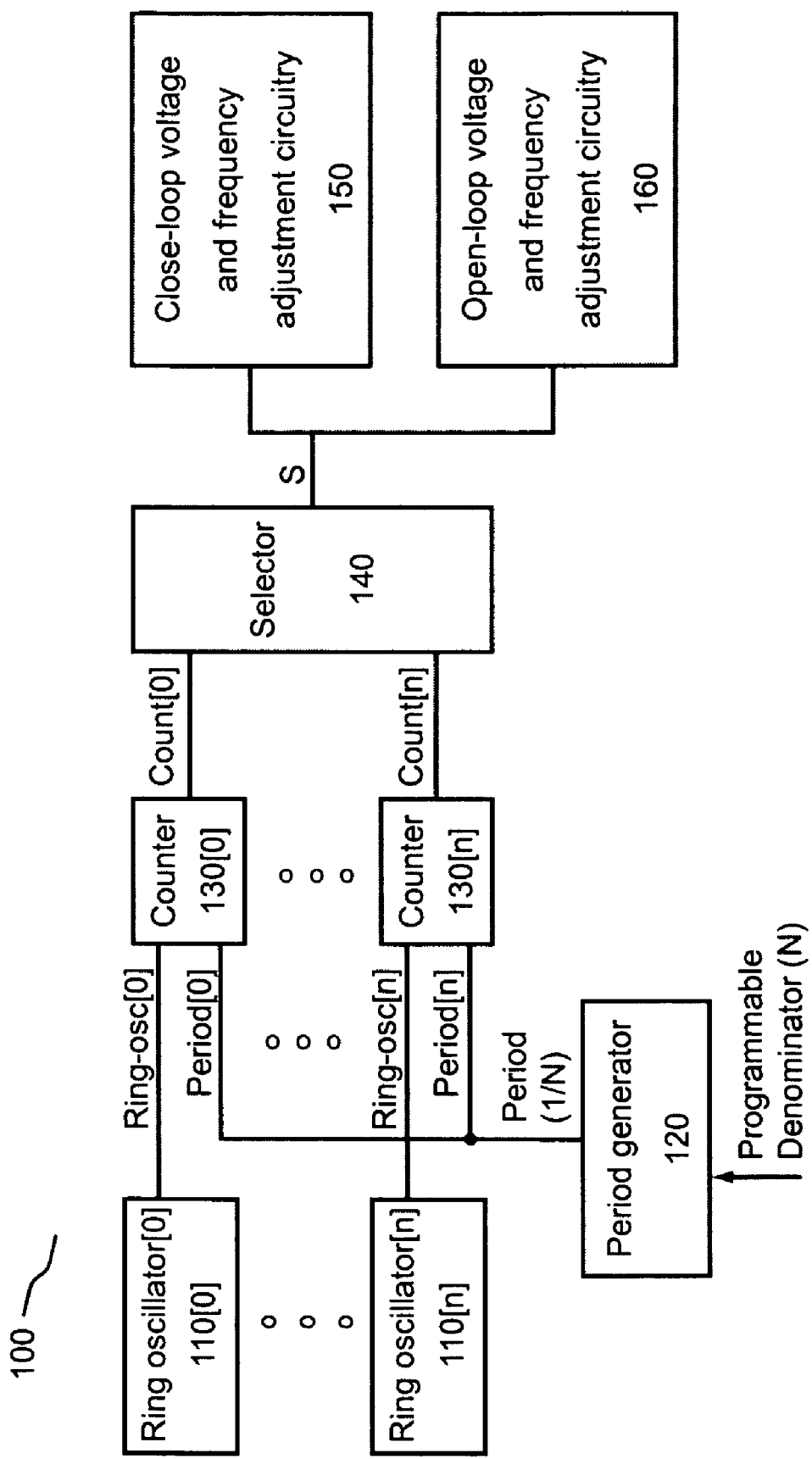
FIG. 1 is a block diagram illustrating a dynamic voltage and frequency management system according to one embodiment of the present invention.

FIG. 1 is a block diagram illustrating a dynamic voltage and frequency management (DVFM) system 100 for an IC according to one embodiment of the present invention. The DVFM system 100 comprises a plurality of ring oscillators 110[0:n], a period generator 120, a plurality of counters 130 [0:n], a selector 140, a close-loop voltage-and-frequency adjustment circuitry 150 and an open-loop voltage-and-frequency adjustment circuitry 160. Outputs of the ring oscillators 110[0:n] are connected to the inputs of the corresponding counter 130[0:n]. The output of the period generator 120 feed to all the counters 130[0:n]. All the counter 130[0:n]'s outputs, count[0:n], are connected to the selector 140's inputs. A selector 140's output is connected to the close-loop voltage-and-frequency adjustment circuitry 150 and an open-loop voltage-and-frequency adjustment circuitry 160 if the system employs both of them. In some cases, only one voltage-and-frequency adjustment circuitry, either close-loop 150 or open-loop 160, is used.

The ring oscillators 110[0:n] are designed to emulate the effect of process parameters, operating voltage and temperature (PVT) of critical paths in the IC. Process parameters across a wafer as well as across a die may vary, placing multiple ring oscillators across a die tracks such variations. In a slow corner the ring oscillator placed there will all oscillate at a slower frequency than a normal frequency. When the operating voltage increases, the ring oscillator frequency will also increase. Temperature affects the ring oscillator through altering device parameters, a net effect is when temperatures increase, and the ring oscillator frequency decreases.

The period generator 120 produces a pulse of predetermined pulse width or period, which determines a length of time during which the counter 130 counts the number of pulses the ring oscillator 110 generates. The longer the pulse width of the period generator 120, the finer granulation the DVFM system can emulate the effect of the PVT variations. The predetermined pulse width is programmable by modifying a denominator (N).

Figure 2:
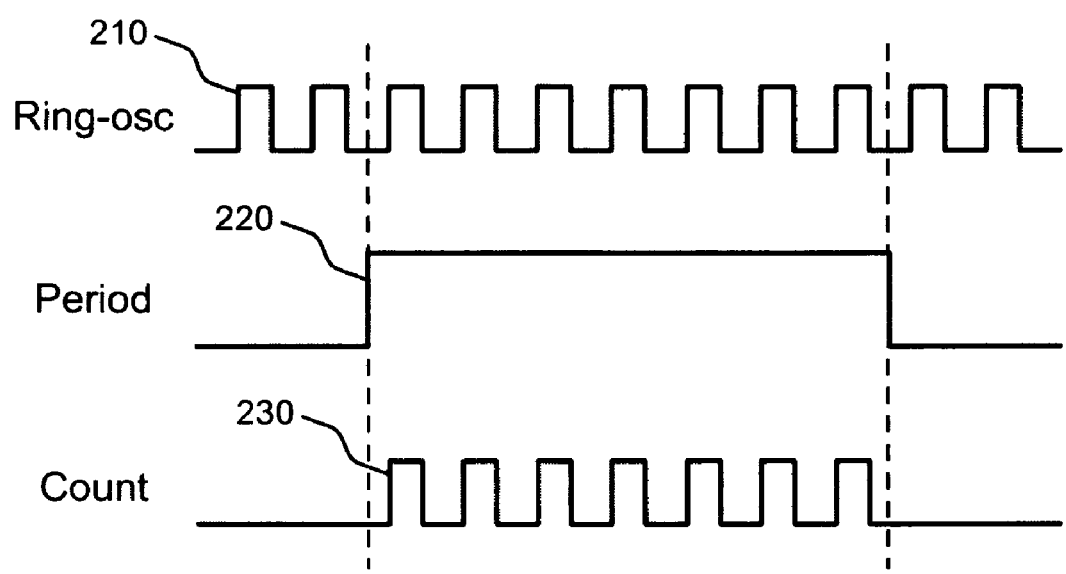
FIG. 2 is a waveform diagram illustrating a voltage quantifying scheme by using a counter.

FIG. 2 is a waveform diagram illustrating a parameter quantifying scheme by using the counters 130[0:n]. The counter 130 has two inputs, one is continuous pulses 210, and the other is a single gating period 220. At a rising edge of the gating period 220, the counter 130 starts counting the number of continuous pulses 210, and at a falling edge of the gating period 220, the counter 110 stops counting. Then a total number of the continuous pulses that passes the gating period 220 is obtained and serves as an output 230 of the counter 130. If the gating period 220 is fixed, than the counter output 230 is proportional to the frequency of the continuous pulse 210. On the other hand, if the frequency of the continuous pulse 210 is fixed, then the counter output 230 is proportional to a length of the gating period 220.

Referring back to FIG. 1, according to one embodiment of the present invention, the continuous pulse 210 is an output of the ring oscillator 110[n], which correlates with the effect of the PVT. The gating period 220 is an output of the period generator 120. Then the counter 130 quantifies the PVT effects on the die.

Referring to FIG. 1, the selector 140 is used to select a smallest number from its inputs, count[0:n]. In another case, the selector 140 can choose a particular counter-and-ring-oscillator path which is considered as most critical to the circuit performance. An output of the selector 140 sends a signal S to the voltage-and-frequency adjustment circuitry 150 for determining a lowest operating voltage given a frequency or a highest operating frequency given to a voltage to achieve power a saving purpose for the IC.

Figure 3A:
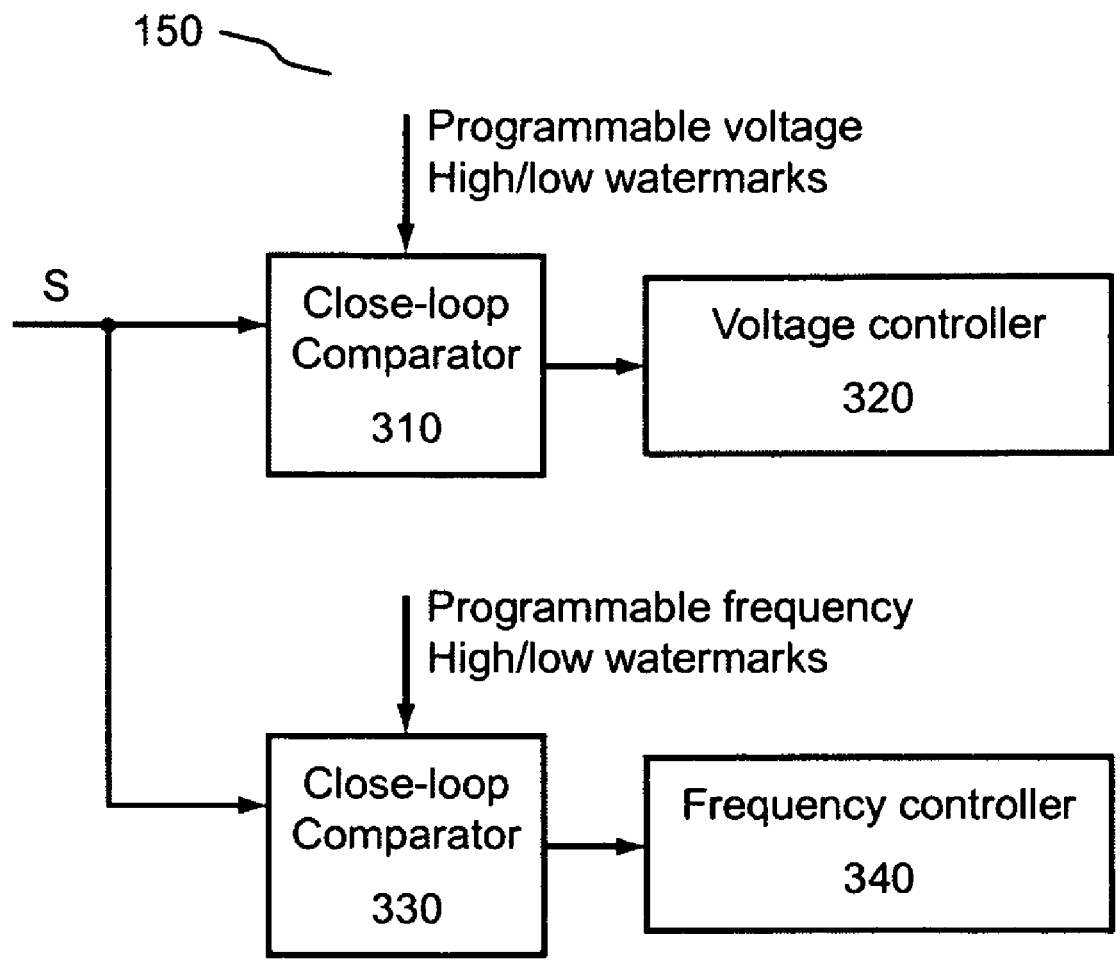
FIGS. 3A and 3B are block diagrams illustrating a close-loop and open-loop voltage-and-frequency adjustment circuitries, respectively.

FIG. 3A is block diagram illustrating a close-loop voltage-and-frequency adjustment circuitry 150. Signal S serves as an input to both close-loop comparators 310 and 330, which base on programmable high-and-low watermarks to translate signal S into operating voltage and clock frequency control signals, respectively.

Referring to FIG. 3A, a voltage controller 320 takes the operating voltage control signal as an input and updates the operating voltage of the corresponding power domain continuously. Supposing the IC requires operating at a certain frequency, and the DVFM system has been previously characterized in worst case condition for this frequency that a voltage high water mark is M, and a voltage low water mark is N. If the IC operates at a low temperature or the IC has better process parameters, and as a result, the signal S can be a value larger than M, which means at current clock frequency, the operating voltage of the IC can still be lowered. Lower operating voltage reduces the ring oscillator 110[0:n]'s frequency, then counter 130[0:n]'s outputs and selector 140's output, i.e., the signal S, will all be lowered, until it becomes less than M. In such way, for every given frequency, the DVFM system can determine a lowest operating voltage. But if the signal S is a value smaller than N, it means the IC operates at a very worse condition (e.g. Voltage is too low). In this case, the operating voltage has to rise to maintain correct functionality.

Referring to FIG. 3A, similarly, a frequency controller 340 takes the clock frequency control signal as an input and updates the clock frequency of the corresponding circuit continuously. Supposing the IC requires operating at a certain voltage, and the DVFM has previously characterized in worst case condition for this operating voltage that a frequency high water mark is P, and a frequency low water mark is Q. If the IC operates at a low temperature or the IC has better process parameters, and as a result, the signal S can be a value larger than P, which means at current operating voltage, there are still rooms to raise the clock frequency, and the frequency controller 340 raises the clock frequency accordingly. Higher clock frequency increases the temperature of the corresponding circuit, thus the ring oscillator 110 [0:n]'s frequency is reduced as well, then the counter 130 [0:n]'s outputs and selector 140's output, i.e. the signal S, will all be lowered, until it becomes less than P. In such way, for every given operating voltage, the DVFM system can determine a highest clock frequency. But if the signal S is smaller than Q, it means the IC operates in a very worse condition (e.g. Temperature is too high). In this case, the frequency has to lower to maintain correct functionality.

Figure 3B:
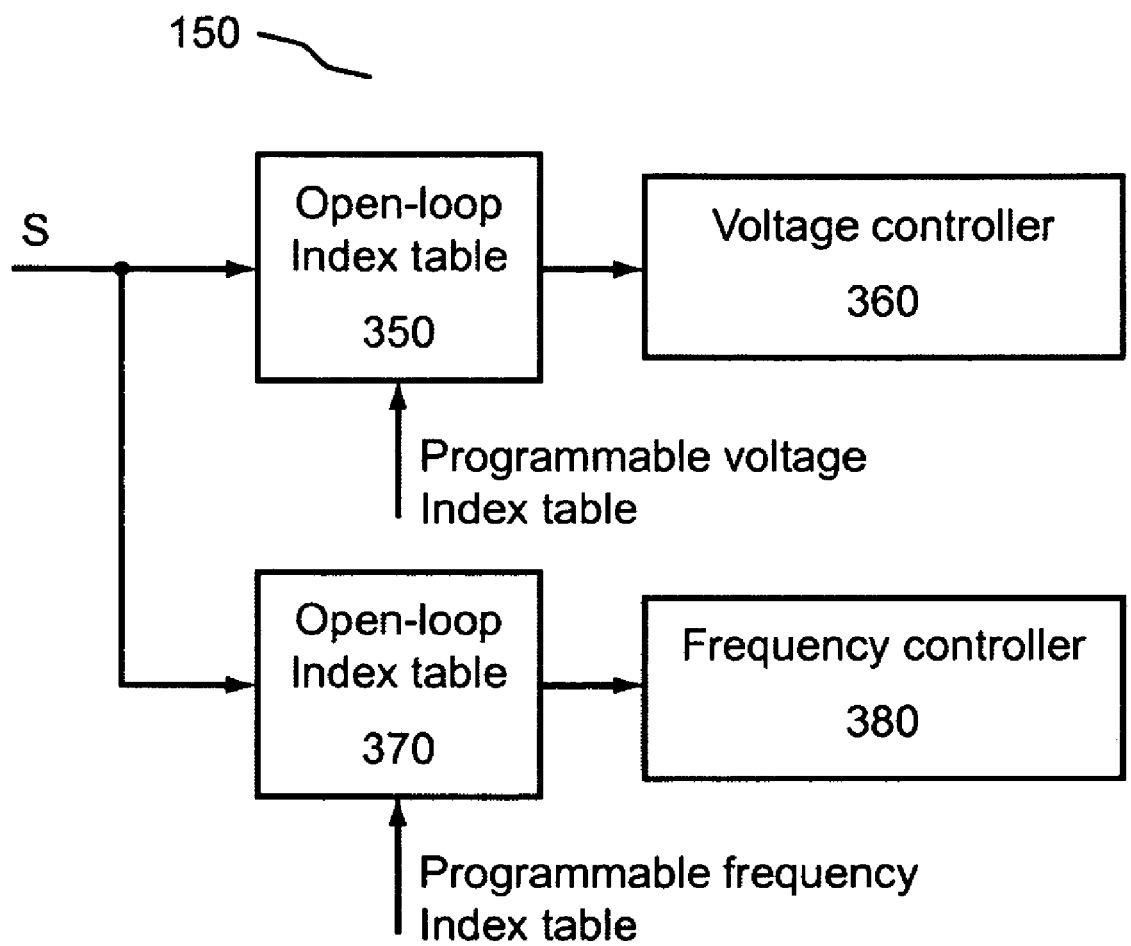

FIG. 3B is a block diagram illustrating an open-loop voltage-and-frequency adjustment circuitry 160. Signal S serves as an input to both open-loop index tables 350 and 370, which is based on a programmable voltage and frequency index tables to translate signal S into operating voltage and clock frequency control signals, respectively. A voltage controller 360 takes the operating voltage control signal to change an operating voltage to a targeted value. Similarly, a frequency controller 380 takes the clock frequency control signal to change a clock frequency to a targeted value.

FIGS. 4A and 4B illustrates an open-loop index table for voltage and frequency controls, respectively. Referring to FIG. 4A, an open-loop index table 405 stores two columns of data, ring OSC count number in column 410 and its corresponding voltage value in column 420. From a ring OSC count number in columns 410, a voltage value can be determined from a corresponding row in column 420. Referring to FIG. 4B, similarly, an open-loop index table 425 stores two columns of data, ring OSC count number in column 430 and its corresponding frequency in column 440. From a ring OSC count number in column 430, a frequency can be determined from a corresponding row in column 440.

Referring to FIG. 3B and FIG. 4A, supposing the IC requires to operate at a certain performance level, and after it is set, the signal S will be used to be compared with the ring OSC count values stored in column 410. If the IC operates at a low temperature or the IC has better process parameters, and as a result, the signal S is number A, which is higher than the ring's OSC count number R and less than the ring OSC count number R+1, then the operating voltage of the IC can be lowered and set to the voltage value R stored in column 420. In such way, for every given frequency, the DVFM system can determine a lowest operating voltage.

Referring to FIG. 3B and FIG. 4A, similarly, supposing the IC requires operating at a certain performance level, and after it is set, the signal S will be used to be compared with the ring's OSC count values stored in column 430. If the IC operates at a low temperature or the IC has better process parameters, and as a result, the signal S is number A, which is higher than the ring's OSC count number R and less than the ring OSC count number R+1. Then it means at current operating voltage, there are still rooms to raise the clock frequency, and the frequency controller 380 raises the clock frequency according to the frequency value R stored in column 440. In such way, for every given operating voltage, the DVFM system can determine a highest clock frequency.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A dynamic voltage and frequency management (DVFM) system in an integrated circuit (IC), the system comprising:
    a plurality of ring oscillators for generating a plurality of continuous pulses with frequencies reflecting the process parameter, operating voltage and temperature (PVT) effects in the IC;
    at least one period generator for generating at least one gating period with a predetermined duration;
    a plurality of counters coupling to the plurality of ring oscillators as well as the period generator for counting the number of continuous pulses in the gating period;
    at least one selector for selecting a predetermined number counted by the plurality of counters; and
    at least one voltage-and-frequency adjustment circuitry for adjusting one or more operating voltages or one or more clock frequencies in the IC based on the predetermined number selected by the selector,
    wherein the IC operating voltage or clock frequency correlates with the ring oscillator frequencies.

2. The DVFM system of claim 1, wherein the voltage-and-frequency adjustment circuitry further comprises at least one voltage control module.

3. The DVFM system of claim 2, wherein the voltage control module further comprises at least one close-loop comparator for comparing an operating voltage with a target voltage that correlates with the ring oscillator frequencies.

4. The DVFM system of claim 2, wherein the voltage control module further comprises one or more open-loop index table units for providing one or more target voltages that correlate with the ring oscillator frequencies.

5. The DVFM system of claim 1, wherein the voltage-and-frequency adjustment circuitry further comprises at least one frequency control module.

6. The DVFM system of claim 5, wherein the frequency control module further comprises at least one close-loop comparator for comparing a clock frequency with a target frequency that correlates with the ring oscillator frequencies.

7. The DVFM system of claim 5, wherein the frequency control module further comprises one or more open-loop index table units for determining one or more target frequencies that correlate with the ring oscillator frequencies.

8. The DVFM system of claim 1, wherein the predetermined number selected by the selector is the smallest number among all the numbers counted by the counters.

9. A dynamic voltage and frequency management (DVFM) system in an integrated circuit (IC), the system comprising:
    a plurality of ring oscillators for generating a plurality of continuous pulses with frequencies reflecting the process parameter, operating voltage and temperature (PVT) effects in the IC;
    at least one period generator for generating at least one gating period with a predetermined duration;
    a plurality of counters coupling to the plurality of ring oscillators as well as the period generator for counting the number of continuous pulses in the gating period;
    at least one selector for selecting a predetermined number counted by the plurality of counters;
    at least one voltage control module coupling to a selector output for adjusting one or more operating voltages in the IC based on the predetermined number selected by the selector; and
    at least one frequency control module coupling to a selector output for adjusting one or more clock frequencies in the IC based on the predetermined number selected by the selector,
    wherein the IC operating voltage and clock frequency correlate with the ring oscillator frequencies.

10. The DVFM system of claim 9, wherein the voltage control module further comprises at least one close-loop comparator for comparing an operating voltage with a target voltage that correlates with the ring oscillator frequencies.

11. The DVFM system of claim 9, wherein the voltage control module further comprises one or more open-loop index table units for providing one or more target voltages that correlate with the ring oscillator frequencies.

12. The DVFM system of claim 9, wherein the frequency control module further comprises at least one close-loop comparator for comparing a clock frequency with a target frequency that correlates with the ring oscillator frequencies.

13. The DVFM system of claim 9, wherein the frequency control module further comprises one or more open-loop index table units for determining one or more target frequencies that correlate with the ring oscillator frequencies.

14. The DVFM system of claim 9, wherein the predetermined number selected by the selector is the smallest number among all the numbers counted by the counters.

15. A method for dynamically managing voltage and frequency in an integrated circuit (IC), the method comprising:

tracking process parameters, operating voltage and temperature (PVT) effects of the IC by a plurality of ring oscillators;

quantifying the PVT effects through counting the numbers of pulses generated by the ring oscillators during a predetermined length of time;

selecting at least one quantified PVT effect number based on a predetermined criterion;

determining one or more operating voltage targets based on the selected quantified PVT effect number; and determining one or more clock frequency targets based on the selected quantified PVT effect number.

16. The method of claim 15, wherein the predetermined criterion is to select a smallest number among the quantified PVT effect numbers.

17. The method of claim 15 further comprising controlling the operating voltage through one or more close-loop comparators based on the operating voltage targets.

18. The method of claim 15 further comprising controlling the operating voltage through one or more open-loop index table units based on the operating voltage targets.

19. The method of claim 15 further comprising controlling the clock frequency through one or more close-loop comparators based on the clock frequency targets.

20. The method of claim 15 further comprising controlling the clock frequency through one or more open-loop index table units based on the clock frequency targets.

* * * * *